United States Patent Office 2,773,090
Patented Dec. 4, 1956

2,773,090

PROCESS FOR PREPARING PURE DIMETHYLTEREPHTHALATE FROM THE CARBONYLATION OF AROMATIC HALIDES

Henry J. Leibu, Orange, Tex., assignor to E. I. du Pont de Nemours and Company, Wilmington, Del., a corporation of Delaware No Drawing. Application March 10, 1953,
Serial No. 341,603

4 Claims. (Cl. 260—475)

This invention relates to a process for the preparation of pure dimethylterephthalate.

At the present time, dimethylterephthalate has considerable importance as an intermediate in the manufacture of polyterephthalate fibers. A preferred method for the manufacture of dimethylterephthalate is by esterification of the air-oxidation products of p-xylene, and in this way ester which is sufficiently free of impurities which interfere with polymer formation can be produced quite readily.

A recently developed method for manufacturing dimethylterephthalate is by reaction between p-dichlorobenzene and carbon monoxide in the presence of nickel carbonyl and a methoxy donor such as methanol and/or dimethyl ether, and/or methyl acetate. It is now known that the crude product thus obtained contains a certain amount of p-chlorobenzoic acid which is not separated from the dimethyl terephthalate by distillation, and which causes difficulty in the direct separation of polymer grade dimethyl terephthalate. Moreover, ordinary distillation of the crude product is accompanied by vaporization of monomethylterephthalate and the deposition of insoluble terephthalic acid inside the distillation column. This phenomenon is probably caused by the noncatalytic ester interchange reactions which take place during the distillation. The crude dimethylterephthalate which is obtained by the carbonylation of p-dichlorobenzene in the presence of methoxy donor in accordance with the above-mentioned process (cf. U. S. 2,565,462) can be converted to polymer grade ester by further purification, such as recrystallization or extraction with a base, but of course these operations are somewhat costly, and a need has therefore arisen for a more economical process for making the diester, free of impurities, from p-dichlorobenzene carbonylation products.

An object of this invention is to provide an improved process for preparing pure dimethylterephthalate from p-dichlorobenzene which does not require removal of aromatic acidic impurities by extraction with a base or other costly procedures for destroying or removing the said acidic impurities. Other objects of the invention will appear hereinafter.

It has been discovered in accordance with this invention that, although the original dimethylterephthalate fraction produced in the process hereinabove mentioned is not of polymer grade, i. e. cannot be used in making highest quality polyester fibers, the said fraction, or total crude can be converted to polymer quality ester and heating with methanol, preferably in the absence of added catalyst, followed by redistillation. In the process of this invention, dimethylterephthalate which contains an amount of acidic impurity not in excess of 0.01 milliequivalent per gram can be prepared by heating p-dichlorobenzene, carbon monoxide, methanol, and nickel carbonyl at a temperature of the range of 275° C. to 425° C. and a pressure in the range of 300 to 1000 atm., separating the liquid phase products in the resulting mixture from the vapor phase products, adding methanol in the quantities hereinbelow specified, to the liquid product (after stripping readily volatilized ingredients), and heating the resulting mixture at a temperature of 200 to 325° C. under autogenous pressure, until the acidity of the product on a methanol-free and water-free basis has been reduced to a level not in excess of 0.2 milliequivalent per gram, and thereafter distilling the resulting mixture whereby a dimethylterephthalate fraction having an acidity not in excess of 0.01 milliequivalent per gram is obtained.

The quantity of methanol which is added to the crude liquid, or fraction thereof, as above described, in accordance with the process of this invention, is preferably about 0.5 to 1.5 parts by weight per part of crude treated. The esterification is carried out by heating the mixture under autogenous pressure at the temperatures hereinabove set forth, preferably 230° to 300° C.

Any convenient or suitable apparatus may be used in the carbonylation of p-chlorobenzene according to the process of this invention. In batchwise operation, pressure-resistant autoclaves made of or lined with relatively inert materials such as stainless steel, silver, copper, etc., may be employed advantageously. In continuous operation, tubular reaction vessels may be employed and if desired the reactants may be introduced at more than one point along the reaction vessel. Similarly, in treating the liquid phase crude carbonylation product with methanol, any suitable pressure resistant apparatus made of or lined with such relatively inert metals may be employed and the process may be conducted either batchwise or continuously.

The acidity of the ester compositions reported herein is determined by titration of the cooled samples with 0.1 N sodium hydroxide, using phenol red as the indicator.

The invention is illustrated further by means of the following example.

*Example*

A feed mixture consisting of 30.9% by weight of p-dichlorobenzene, 26.9% of methanol, 38.6% of dimethyl ether and 3.6% of nickel carbonyl was introduced into a continuous carbonylation reactor with 11.3 moles of carbon monoxide per mole of p-dichlorobenzene. The temperature in the vessel was maintained at 370°, the pressure at 645 atmospheres, and the residence time at 2.5 hours. Evaporation of low-boilers (methanol, nickel carbonyl, dimethyl ether) from the effluent gave a crude product containing about 24% aromatic acidic by-products (monomethyl terephthalate, p-chlorobenzoic acid), the remainder being nearly all dimethylterephthalate. A 14 gram sample of this product (B. P. mostly at ca. 278° to 282° C. at atmospheric pressure) was heated in an autoclave with 32 grams of methanol at 270° C. for 0.5 hour without added catalyst, which caused the free acidity in the product to drop to 0.106 milliequivalent per gram (methanol-free basis). Another 14 gram sample was heated in the same way with 64 grams of methanol at 270° for 0.5 hour, and the corresponding free acidity dropped to 0.071 m. eq./gram. The latter experiment was repeated at 230° and 250° respectively and the free acidity dropped to 0.186 and 0.16 m. eq./gram respectively. At 200° the experiment was repeated, using a reaction time of 1 hour instead of 0.5 hour. The free acidity of the methanol-free product was 0.148 m. eq./gram. Distillation of the methanolysis product in each instance gave virtually pure dimethylterephthalate, having acidity below 0.01 milliequivalent per gram.

The effect of the refining step on polymer quality was demonstrated in comparative experiments, performed as follows. Several batches of purified dimethylterephthalate, prepared as set forth in the example just given, were combined and redistilled through a 6 ft. 3 in. x 1 in. Fenske packed column (the initial distillation having been performed through a 24 bulb column), gave dimethyl terephthalate (B. P. 282° C., acidity not in excess of 0.008 milliequivalent per gram, percent Cl, 0.0) which was esterified with ethylene glycol in the presence of a catalyst composed of 0.02% PbO, 0.05% $Sb_2O_3$ and 0.1% triphenyl phosphite (based on weight of dimethyl terephthalate) at 275° C., under "vacuum" for six hours. The resulting product contained 20.6 equivalents of carboxyl end groups per $10^6$ grams, and a relative viscosity (yarn) of 30.4. Yarn spun from this polymer had a tenacity of 4.7 grams per denier at a break elongation of 20.2%, and the yarn drew without breaks (one pound being drawn); it was substantially equivalent to polyester polymer made by similar esterification of dimethyl terephthalate ex p-xylene. In contrast with this, dimethyl terephthalate made as above described without the final refining steps, and having an acidity of 0.112 milliequivalent per gram, could not be employed in making polyesters of high relative viscosities (above 17). In a series of similar experiments it became apparent that the reaction time required to produce polyester was also adversely affected by acidity, i. e. inversely dependent upon the acidity level, and that for the most economical continuous production of polymer, as well as for producing a relative viscosity sufficient for fiber manufacture, the acidity should be held down to below 0.01 and preferably not in excess of about 0.006 milliequivalent per gram.

One of the advantages in the present invention resides in eliminating the need for excessive amounts of alkoxy donor in the carbonylation step. This results from carrying out the methanolysis of the crude in an environment in which carbonylation does not occur.

Numerous methods for modifying the illustrated procedure will be apparent to those who are skilled in the art. Any unreacted aryl halide collected during the stripping operation may be recovered and recycled. This is true also of the intermediate reaction products such as the methyl ester of monochlorobenzoic acid. The catalyst also may be recovered and recycled by any of the methods known in the art. It is our intention that such changes and modifications to the extent that they are within the scope of the appended claims shall be considered as part of the present invention.

I claim:

1. In a process for preparing dimethylterephthalate containing an amount of acidic impurity not in excess of 0.01 milliequivalent per gram, from the crude reaction products obtained by heating a carbonylation mixture comprising p-dichlorobenzene, carbon monoxide, nickel carbonyl, and an esterifying component comprising methanol, at a temperature within the range of 275 to 425° C. and a pressure within the range of 300 to 1000 atm., the steps which comprise separating the liquid phase from the said crude reaction products, stripping readily volatile ingredients therefrom, adding methanol to the resulting crude ester, heating the resulting mixture at a temperature of 200 to 325° C. under autogenous pressure, and distilling the resulting mixture whereby a dimethylterephthalate fraction containing an amount of acidic impurity not in excess of 0.01 milliequivalent per gram is obtained.

2. Process of claim 1 wherein the said heating under autogenous pressure is at a temperature within the range of 230° to 300° C.

3. Process of claim 1 wherein the said esterifying component of the carbonylation mixture is methanol-dimethyl ether.

4. Process of claim 1 wherein the quantity of methanol which is heated with the said crude ester is 0.5 to 1.5 parts by weight per part of said crude ester, and the acidity of the said crude is not in excess of 0.2 milliequivalent per gram prior to adding the said methanol.

References Cited in the file of this patent

UNITED STATES PATENTS

| | | |
|---|---|---|
| 2,565,464 | Tabet | Aug. 28, 1951 |
| 2,691,671 | Leibu | Oct. 12, 1954 |